United States Patent
Motis

[15] 3,700,021
[45] Oct. 24, 1972

[54] TIRE SERVICING AND INFLATING APPARATUS

[72] Inventor: Gilbert M. Motis, Westlake Village, Calif.

[73] Assignee: The Coats Company, Inc.

[22] Filed: March 8, 1971

[21] Appl. No.: 121,872

[52] U.S. Cl. ................................................ 157/1.1
[51] Int. Cl. ............................................. B60c 25/12
[58] Field of Search..... 157/1.1, 1.2, 1.22, 1.24, 1.26, 157/1.28; 220/35; 248/147

[56] References Cited

UNITED STATES PATENTS

| | | | |
|---|---|---|---|
| 2,936,827 | 5/1960 | Riggs | 157/1.1 |
| 3,255,800 | 6/1966 | Strang et al | 157/1.24 |
| 3,461,938 | 8/1969 | Mueller | 157/1.1 |
| 1,947,879 | 2/1924 | Sandberg et al | 248/147 |
| 2,900,015 | 8/1959 | Harrison | 157/1.1 |
| 3,016,934 | 1/1962 | Smyser | 157/1.1 X |
| 3,137,469 | 6/1964 | Stanley | 248/147 |
| 3,558,088 | 1/1971 | Sherley | 248/147 |

Primary Examiner—Granville Y. Custer, Jr.
Attorney—Hofgren, Wegner, Allen, Stellman & McCord

[57] ABSTRACT

A tire changing stand characterized by the provision of an inflation accessory including a chamber member which is movable toward and away from the rim receiving surface of the tire changing stand into and out of engagement with a tire side wall to create a confined chamber thereabout and to urge one of the tire beads toward seating engagement with its related rim bead seat so that the influx of air under pressure through the rim valve stem may serve to seat and inflate the tire held thereon.

8 Claims, 19 Drawing Figures

PATENTED OCT 24 1972 3,700,021
SHEET 2 OF 9
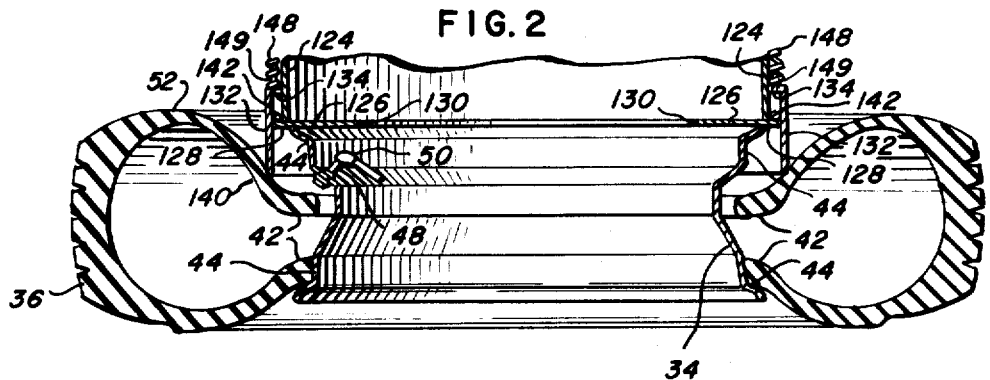
FIG. 2
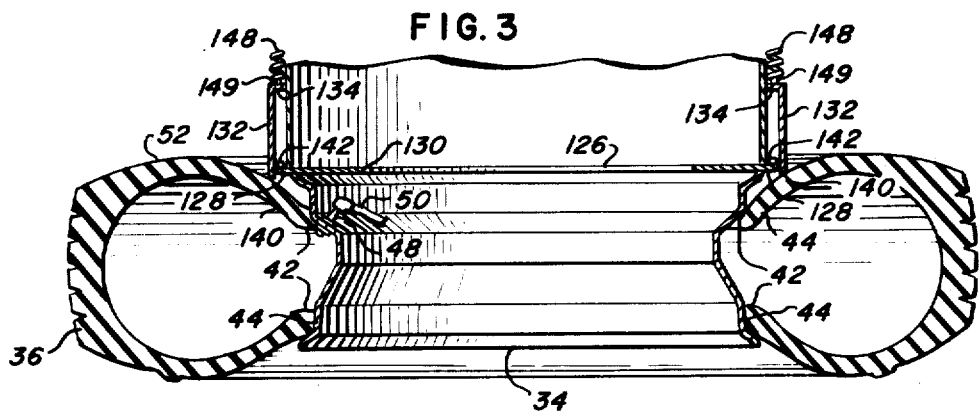
FIG. 3
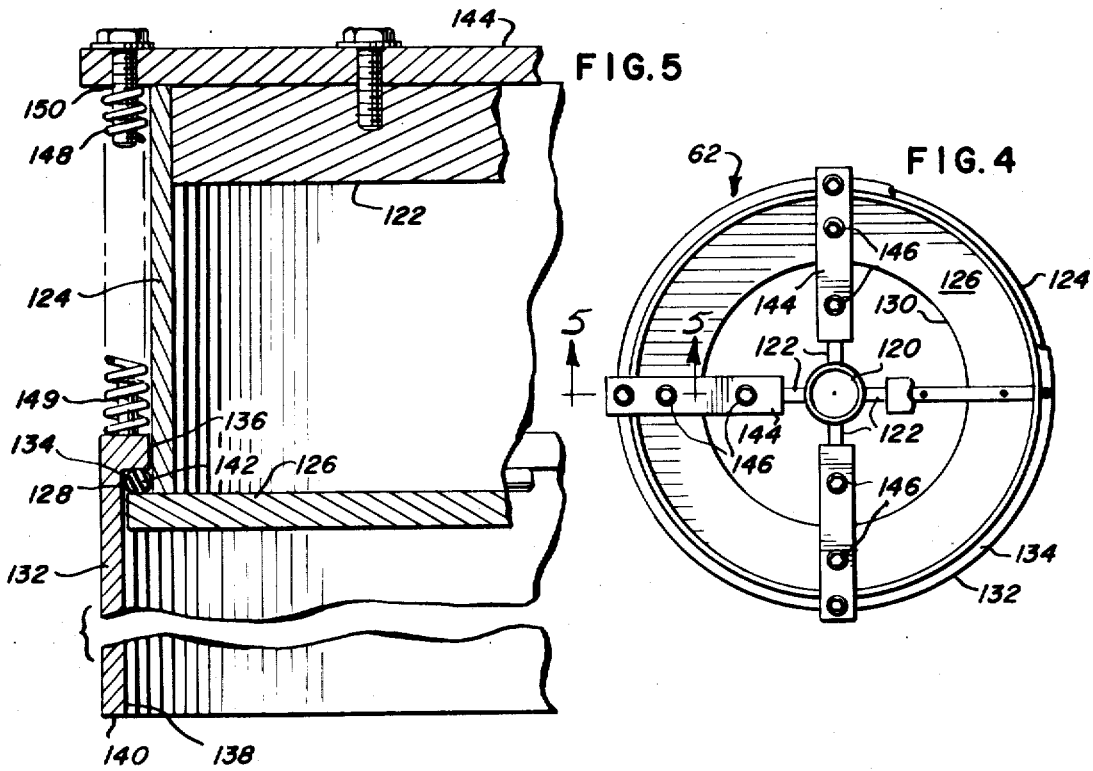
FIG. 5
FIG. 4

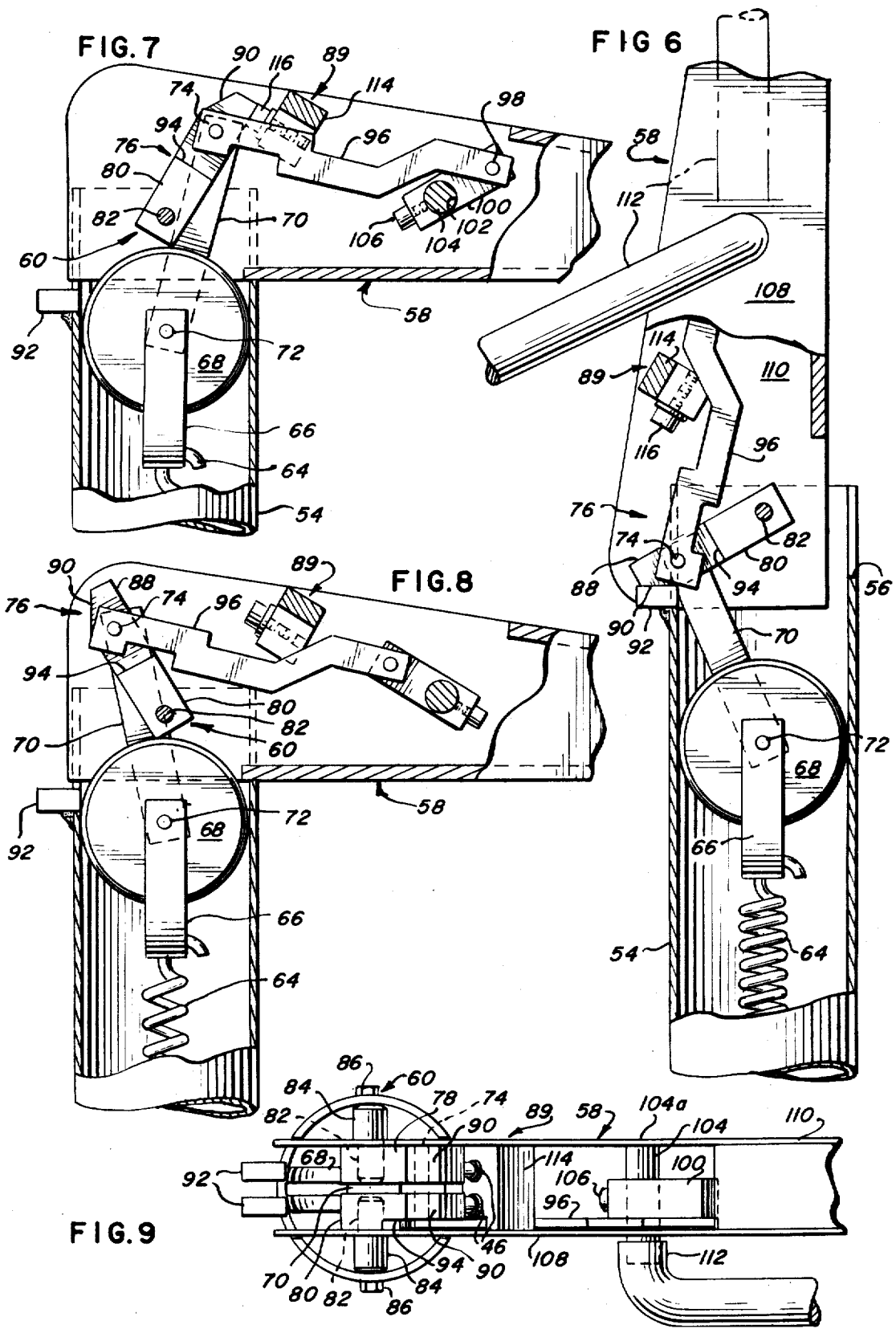

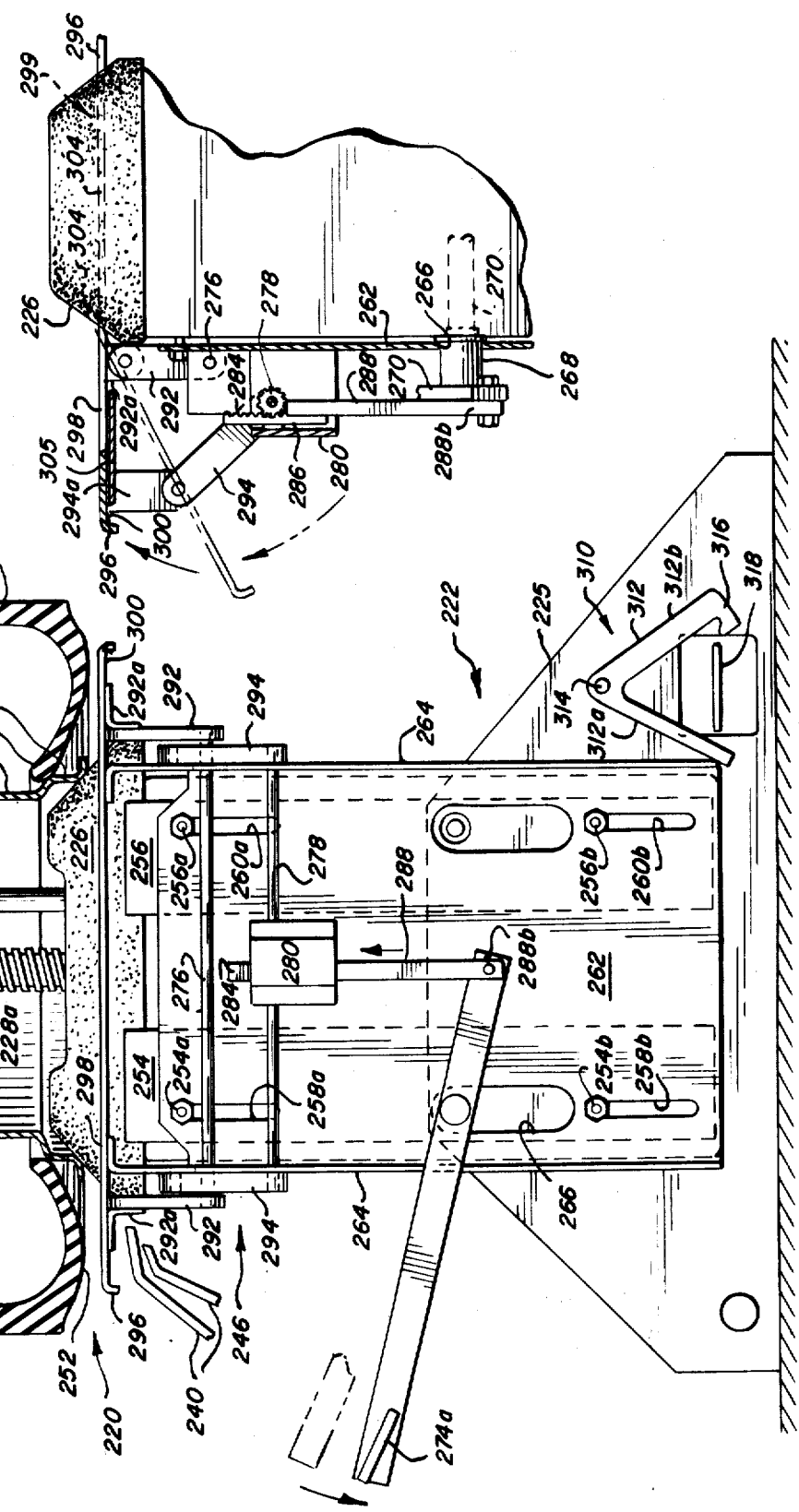

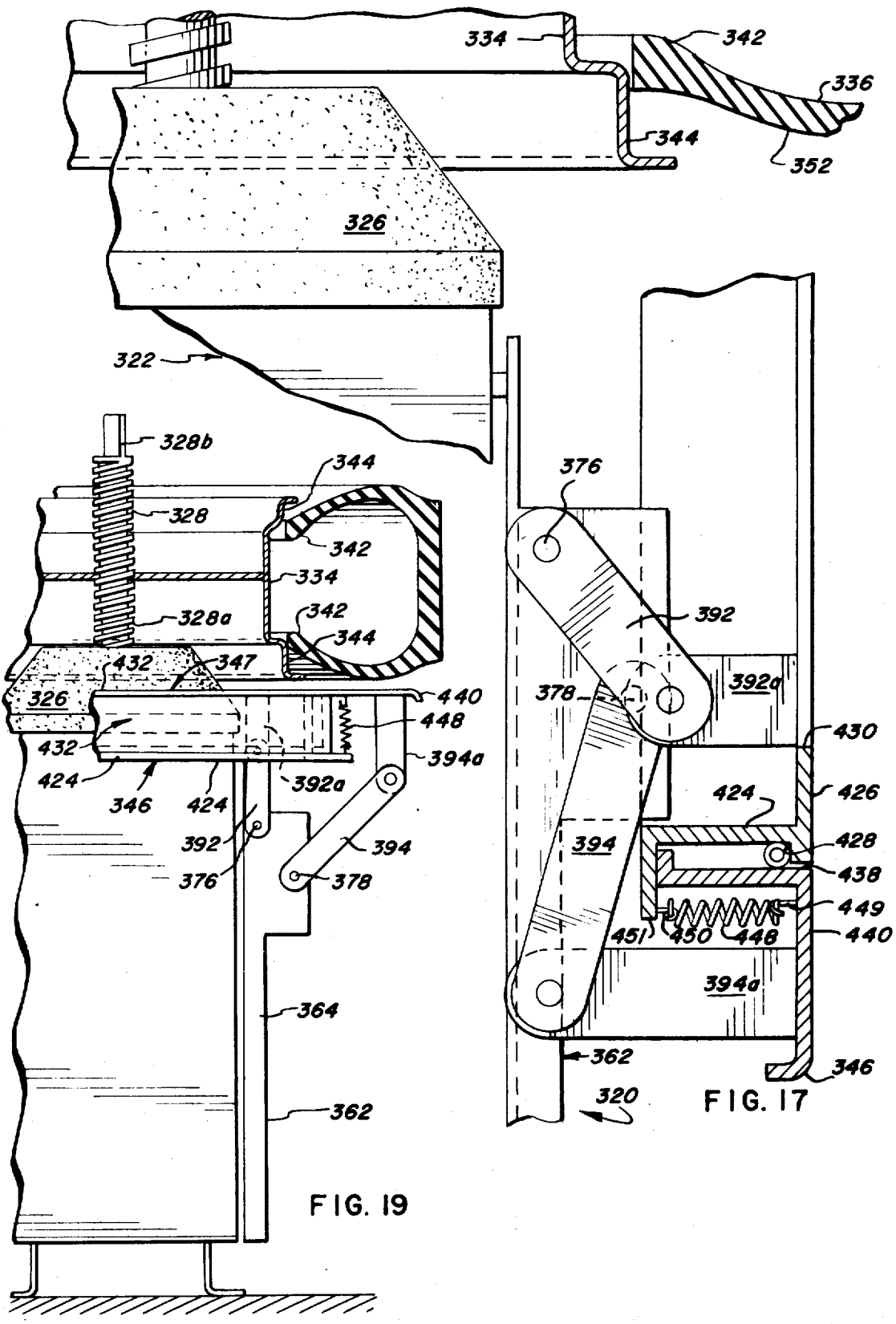

3,700,021

TIRE SERVICING AND INFLATING APPARATUS

BACKGROUND OF THE INVENTION

1. Field of the Invention

This invention relates to tire servicing equipment, and more particularly, to a tire changing stand having an inflation apparatus associated therewith.

2. Brief Description of the Prior Art

In recent years there have been many improvements in equipment for seating tire beads on a wheel rim and inflating the tire beads through the tire through the use of air pressure. Ranallo U.S. Pat. No. 2,874,759, Bishop U.S. Pat. No. 2,874,760, the Varvaro U.S. Pat. No. 2,874,761; and the Corless U.S. Pat. No. 3,552,469, generally disclose a structure for both seating a tire bead on a wheel rim and then inflating the tire onto the rim through the use of air pressure alone.

In the field of tire servicing equipment, such as equipment for removing and replacing tires relative a wheel rim, there is a continuing desire to make the tire servicing operation as quick and as safe as possible. Part of this desire has been to also perform as many functions as possible at the tire changing stand. Heretofore, there has been no satisfactory means in the art for seating the tire bead on the wheel rim and inflating the tire at the tire changing stand. Instead, it has been typical for the assembled tire and wheel rim to be moved to another piece of equipment for performing the seating and inflating function.

There are two examples in the art of tire servicing stands having inflation chamber assemblies. Such structures are shown in the Riggs U.S. Pat. No. 2,936,827 and the Smyser U.S. Pat. No. 3,016,934. However, the tire removal and replacement capability of the stands shown therein is limited and the arrangement for providing an inflation chamber for the tire and rim is not well suited for use with tire changing stands of great versatility, such as a tire changing stand of the type shown in Strang et al. U.S. Pat. No. 3,255,800.

Accordingly, it is the object of this invention to provide an improved tire changing stand having means associated therewith for seating the tire bead onto the bead seat of a wheel rim and subsequently inflating the tire.

SUMMARY OF THE INVENTION

This invention is directed, in brief, to the provision of an improved tire changing stand having bead seating and tire inflating apparatus associated therewith.

Two modes are currently contemplated for carrying out the invention. In one mode the tire changing stand is provided with a laterally affixed column which supports a spring mounted swingable arm. The arm is movable between a retracted position wherein it generally constitutes extension of the shaft, and an extended position wherein it generally overlies the rim receiving area of the tire changing stand. The arm has a first cylindrical drum connected thereto and a second concentrically related cylindrical sleeve affixed to the first drum and normally spring urged away therefrom. When the arm is swung to a position wherein it overlies the rim receiving area of the tire changing stand the sleeve may bear against a tire side wall from above, urging the lower tire bead towards seating engagement with the rim bead seat while urging the upper tire bead towards the lower bead. The bottom of the cylindrical sleeve generally forms a seal with the tire side wall thereby creating a relatively confined chamber. When air under pressure is fed through the tire valve stem, it causes the lower bead to seat, and subsequently fills the interior of the tire until the upper bead seats as well, and the tire reaches the desired inflation pressure.

In another mode of the invention, a chamber for creating pressure against the tire side wall and creating a relatively confined chamber thereabout, moves up from the underside of the rim receiving surface of the tire changing stand. In this mode the chamber structure is formed in two halves, with each half being movably connected to opposite sides of the tire changing stand. The chamber halves may move from a retracted position, wherein they are generally parallel to the side wall of the tire changing stand, to an extended position ready for engagement with the tire side wall, wherein they are assembled together and are generally perpendicular to the side walls of the tire changing stand and substantially parallel with the wheel and rim. Subsequently, the assembled chamber halves may move upwardly against the tire side wall so that the upper tire bead is moved towards seating engagement with the upper rim bead seat and the lower tire bead is moved towards the upper tire bead. Following this, air under pressure is fed through the rim valve stem to move the upper bead into seating engagement with the rim, following which the lower bead is moved into seating engagement with the rim and subsequently, the tire is inflated to the desired pressure.

DESCRIPTION OF THE DRAWINGS

FIG. 2 is a fragmentary enlarged section view through a vehicle rim and tire showing a portion of the inflation chamber in engagement therewith;

FIG. 3 is a view similar to FIG. 2 following the entry of air under pressure through the valve stem;

FIG. 4 is a fragmentary top plan view of the inflation chamber shown in FIG. 1;

FIG. 5 is a fragmentary enlarged section view taken generally along the line 5—5 of FIG. 4;

FIG. 6 is a fragmentary enlarged view in partial section of the support for the inflation chamber in the position shown in FIG. 1;

FIG. 7 is a view similar to FIG. 6 with the movable arm in an extended position wherein the inflation chamber will overlie the rim receiving area and with the arm spring in a downwardly biasing position;

FIG. 8 is a view similar to FIG. 7 with the arm spring in an upwardly biasing position;

FIG. 9 is a top plan view of the structure shown in FIG. 7;

FIG. 13 is a view similar to FIG. 12 showing the chamber forming portions in an assembled position;

FIG. 14 is a fragmentary side elevational view of FIG. 13;

FIG. 17 is a fragmentary end elevational view, partially in section, of another embodiment of a second mode of this invention, showing the chamber assembly sub-portion in a retracted position;

FIG. 19 is an elevational view similar to FIG. 18.

Figure 1:
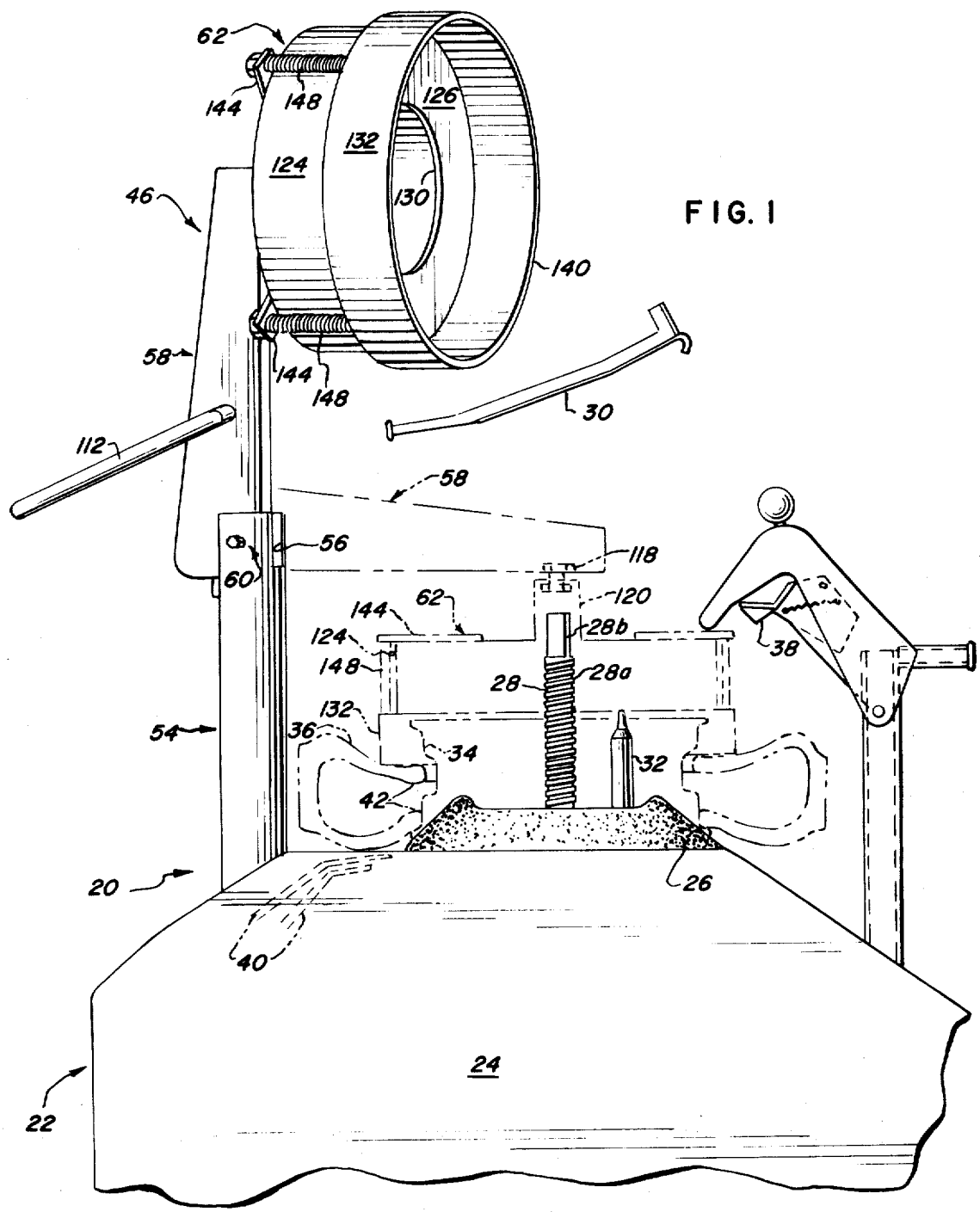
FIG. 1 is a fragmentary view of one mode of the apparatus of this invention showing the inflation chamber in a raised or retracted position relative to a rim receiving surface.

While this invention is susceptible of embodiment in many different forms, there is shown in the drawings and will herein be described in detail specific embodiments therefor, with the understanding that the present disclosure is to be considered as an exemplification of the principles of the invention and is not intended to limit the invention to the embodiments illustrated.

DESCRIPTION OF THE PREFERRED EMBODIMENT

One mode of the combination inflation apparatus and tire changing stand 20 is shown in FIGS. 1 through 9. The apparatus includes a tire changing stand generally indicated 22 of the type disclosed and described in greater detail in Strang et al. U.S. Pat. No. 3,255,800. Generally speaking, the stand 22 includes a housing 24 which supports a rim receiving area 26. A column 28 extends uprightly from the center of the rim receiving area and includes a threaded portion 28a for threadably receiving a clamping member and further includes a rotatable free end portion 28b for driving a tire tool 30 during the tire servicing function. The tire tool 30 is preferably of the type described and claimed in Strang U.S. Pat. No. 3,247,883.

The rim receiving area 26 further includes a positioning pin 32 and the positioning pin 32, together with the column 28, assist in retaining a vehicle rim 34, having a tire 36 carried thereon, relative to the rim receiving area 26 during the tire servicing function. The tire changing stand 22 includes upper bead breaker shoe 38 and lower bead breaker shoes 40 which are driven through a work cycle for separating the tire beads 42 from the rim bead seat 44 so that the tire changing tool 30 may then be driven by the end 28b of column 28 to pry the separated beads 42 over the flange of the rim bead seat 44. Following the removal of the tire 36 from the rim 34, as described, another tire may be replaced thereon through the aid of the driven tire tool 30, following which it is necessary to seat the tire bead 42 relative to the rim bead seat 44 and then inflate the tire. Previously, it has been most common to accomplish this function by means of apparatus separate from the tire changing stand 22. The rim 34 and unseated and uninflated tire 36 would be removed from the stand and taken to another apparatus wherein the bead seating and inflating function would be carried out. However, with the combination 20 of this invention, there is provided an inflation and seating assembly, generally indicated 46, which may be moved to the rim receiving area 26 so that the valve stem 48 of the vehicle rim 34 may be supplied with air under pressure through a hose 50 to introduce air to the interior of the tire and cause the side walls 52 of the tire to expand, thereby seating the tire beads 42 relative to the rim bead seat 44 and subsequently inflating the tire to a desired pressure.

The inflation and seating assembly 46 includes an upright support or column means 54, herein shown as a generally circular cylindrical structure, attached to the housing. The column 54 has a slot 56 extending therethrough at its upper end for receiving arm 58 which is pivoted to the column 54 on pin-like mounting 60 for movement between an upright or retracted position, as shown in full outline in FIG. 1, and movement to a lowered or operative position, as shown in FIG. 1, wherein the inflation chamber 62 is in engagement with a rim 34 and tire 36 for seating the tire beads relative the rim bead seat and inflating the tire by introduction of air under pressure through the rim valve stem 48. The interior of the column 54 includes a spring 64 or biasing means which is secured to the column at one end (not shown) and, at its other end, is secured to a U-shaped strap 66 which, in turn, rotatably supports a pulley or wheel means 68. Pulley 68 has a diameter corresponding to the interior diameter of the column 54, and is positioned in the column 54 with its axis perpendicular to the longitudinal axis of the column 54 so that the pulley 68 may move up and down relative to the column and maintain the spring 64 relatively centered therein.

A bar 70 is pivoted by means of pin 72 to the strap 66, which pin 72 also connects the strap 66 relative to the pulley 68. At its opposite ends, the bar 70 is pivotally connected by means of pin 74 to a movable finger assembly 76.

Movable finger assembly 76 is preferably comprised of two spaced apart fingers 78 and 80. Preferably, the fingers 78 and 80 of the finger assembly 76 are also pivoted about the pivotal connection 60 of the arm 58 to the column 54. The pivot 60 is preferably comprised of two stubs 82 having a spacer sleeve 84 thereabout. The stubs may be threaded at their inner end to be threadably received in the fingers 78 and 80 and are provided with a bolt head 86 at their outer end. The bar 70 extends between the two spaced apart fingers 78 and 80 of the movable finger assembly 76 and thus, is maintained relatively centered with respect to the column 54. At the upper end of each of the fingers 78 and 80 there is a forward stop member engaging surface 88 for engaging forward stop member assembly 89, and a rear stop member engaging surface 90 opposite the surface 88 for engaging rear stop members 92. The rear stop member engaging surface 90 is preferably beveled at approximately a 45° angle relative to the forward stop member engaging surface 88. As best seen in FIG. 6, when the arm 58 is in the upright or raised position, the rear stop engaging surface 90 of the fingers 78 and 80 abuts against the two stop members 92 affixed to the column to prevent further reverse movement of the arm 58 relative to column 54.

Finger 80 has a slot 94 in one side thereof for receiving crank link 96 which is pivoted thereto, preferably on the pivot pin 74 which connects bar 70 to the finger assembly 76. At its opposite end, link 96 is pivoted by means of pin 98 to crank member 100. Crank member 100 has an aperture 102 for receiving rod 104 which is connected to crank member 100 by suitable means, such as a set screw fastener 106 or the like. The rod 104 extends through an aperture in one side wall 108 of arm 58 and is provided with a reduced end 104a for securement to the opposite side wall 110 of arm 58.

An L-shaped arm 112 is connected to rod 104 and the arm 112 is movable between a retracted position, as shown in full outline in FIGS. 1 and 6, and an extended position, as shown in dotted outline in FIG. 6. Movement of the arm 112 between these two positions moves the finger assembly 76 between an under center position, as shown in FIGS. 6 and 8, and an over center position as shown in FIG. 7, by means of the connection of the crank link member 96 to the finger assembly 76. When the finger assembly 76 is in the under center position, as shown in FIGS. 6 and 8, the bar 70 connects the biasing force of spring 64 relative to the arm 58 in such a fashion as to tend to urge the arm upwardly or counterclockwise about its pivotal connection 60 with respect to the column 54. Also, when the fingers 76 are in this under center position, the rear stop engaging surface 90 is positioned to abut the rear stop members 92 when the arm is elevated or raised as shown in FIGS. 1 and 6. When the finger assembly 76 is in the forward, or over center position as seen in FIG. 7, the bar 70 connects the biasing force of the spring 64 to the arm 58 to urge the arm 58 in a clockwise direction, or downwardly about its pivotal connection 60 with respect to column 54 towards the rim receiving area 26 of the tire changing stand.

The forward stop assembly 89 for the finger assembly 76 includes a member 114 which spans the side walls 110 and 108 of the arm 58. Preferably, the member 114 is provided with means for adjusting the location orientation of the forward stop surface afforded by assembly 89. In the illustrated embodiment, this adjustable means takes the form of two lock screw members 116 which may be threaded relative to their fastening engagement with member 114 and locked in selected positions to adjust the location of the forward stop surface afforded by assembly 89.

The inflation chamber assembly 62 is connected to the forward or free end of the arm assembly 58 by a suitable means, such as a shaft and nut connection 118, or the like. The inflation chamber assembly 62 includes a central stub portion 120 which supports radially extending frame members or arms 122. The arms 122 are connected to the interior of a first or inner inflation assembly sleeve 124. Sleeve 124 has a ring or flange 126 at the bottom thereof which has a small portion 128 that projects beyond the outer periphery of sleeve 124 and an enlarged central opening 130.

The inflation chamber or assembly 62 further includes a second or outer concentrically associated sleeve 132 which has an upper, inwardly directed, annular lip 134 of a dimension to overhang the outer projection 128 of ring 126 of the upper sleeve 124. The upper lip 134 terminates in an enlarged opening 136 of a size to closely embrace the outer periphery of upper sleeve 124. The bottom of lower sleeve 132 terminates in open end 138, so that the bottom edge of sleeve 132 provides an annular tire side wall engaging surface 140. An annular sealing ring 142 is interposed between the lip 134 of lower sleeve 132 and projection 128 of upper sleeve 124.

Means are provided for normally biasing the lower sleeve 132 away from the upper sleeve 124. In the illustrated embodiment, mounting bars 144 are fastened to arms 122 by suitable fasteners 146. A plurality of springs 148 are interposed between a stub 149 on the lower sleeve 132 and a pin 150 which projects downwardly from the outer end of bars 144.

In use, when the arm 58 is lowered and the arm 112 is moved to place the finger assembly 76 in an over center position, the bottom surface 140 of sleeve 132 engages a tire side wall 52 and the lower sleeve is relatively retracted with respect to the upper sleeve 124 against the urging of the springs 148 until the flange 126 of the upper sleeve 124 engages rim 34. The assembly 62 cooperates with the tire 36 and rim 34 to form a substantially closed chamber capable of sufficiently retaining an initial volume of air under pressure so as to cause the tire beads 42 to seal against the rim bead seats 44. Air under pressure may be introduced by means of hose 50 to valve stem 48 within the chamber defined by the inflation assembly 62 and into the interior of the tire 36 to initially cause the tire beads 42 to move towards the rim bead seats 44, following which the continued introduction of air under pressure will inflate the tires to a desired pressure.

Another mode 220 of the combination inflation apparatus and tire changing stand of this invention is shown in FIGS. 10 through 16. The apparatus 220 also preferably includes a tire changing stand 222 of the type described and claimed in Strang et al. U.S. Pat. No. 3,255,800. The housing portions of the tire changing stand 222 are removed in FIGS. 10 through 16 to expose base framing portions 225 for clarity of illustration. Again, the stand is provided with a rim receiving surface 226 and an upright column 228, having a threaded portion 228a for receiving a clamping member, and a driven portion 228b for driving a tire tool. Further, the stand 222 is provided with a positioning pin 232 to assist in retaining a rim 234 having a tire 236 thereon during the tire servicing function, including the stroke of upper and lower bead breaker shoes 238 and 240, for separating tire beads 242 from rim bead seats 244.

The inflation and seating assembly 246 utilized with the apparatus 220 of this invention is also intended to create a chamber or the like with respect to the rim 234 and tire 236 so that the valve stem 248 of rim 234 may receive air under pressure from hose 250. The introduction of air under pressure through valve stem 248 will cause side walls 252 of the tire to expand and the tire beads 242 will seat on the rim bead seats 244 so that the tire may be inflated to a desired pressure.

Base frame portion 225 supports opposed pairs of upright frame beams 254 and 256. Guide pins 254a, 254b and 256a and 256b project outwardly from the upper and lower ends of each of the frame beams 254 and 256, respectively. Each of these guide pins extends through guide slots 258a, 258b, 260a and 260b of movable inflation chamber assembly frame member 262. Each movable inflation chamber assembly frame member 262 on each side of the stand 222 is generally a flat, panel-like member having peripheral flange portions 264. Each frame member 262 is further provided with an enlarged connecting rod receiving opening 266 through which connecting rod sleeve 268 extends for rotatably mounting connecting rod 270 with respect to the frame members 262. On one side of the tire changing stand 222 the connecting rod 270 is connected with operating lever 274 having a foot receiving pedal 274a, or the like, at the free end thereof. Movement of the lever 274 will be transmitted through rod 270 to cause simultaneous movement of the components with which the connecting rod 270 is connected on the opposite side of the tire changing stand 222.

On each side of the tire changing stand 222, the frame member 262 rotatably supports inflation chamber sub-portion actuating rods 276 and 278, between the flanges 264. Rod 278 extends through U-shaped bracket member 280, which is fixed to frame member 262, and, in the area of the bracket 280, the rod 278 has a pinion 282 fixed thereto. Pinion 282 is in meshing engagement with the teeth 284 of a rack 286 which is connected to one face of bar 288. Bar 288 has a free end 288a which is offset relative to rack 286, underlying pinion 282 and therefore limits the travel of the rack 286 with respect to the pinion 282. The opposite end 288b of bar 288 is pivoted, on the other side of the stand 222, to link 290, both of which serve the function of interconnecting the connecting rod 270 with the bar 288 so that rotation of the connecting rod 270 responsive to movement of the lever 272 will cause to-and-fro movement of the bar 288 and rack 286 in an upright plane. This, in turn, through the provision of pinion 282 will cause rotation of rod 278.

Figure 10:
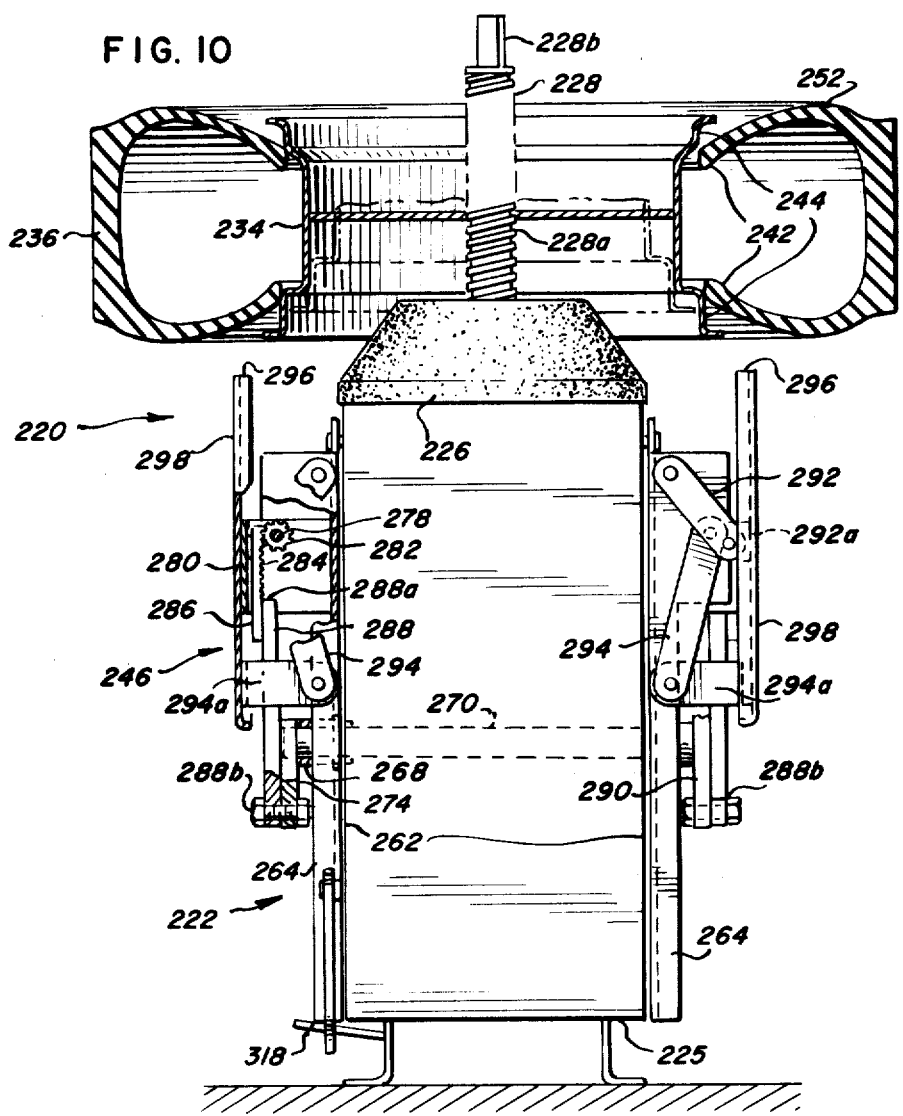
FIG. 10 is an end elevational view partially broken away in section of a second mode of this invention.
Figure 11:
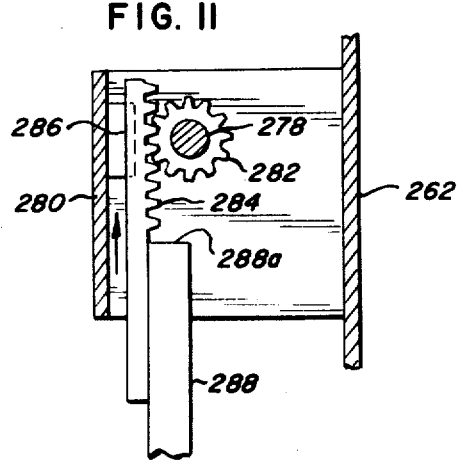
FIG. 11 is a fragmentary enlarged view of a portion of the structure shown in FIG. 10.
Figure 12:
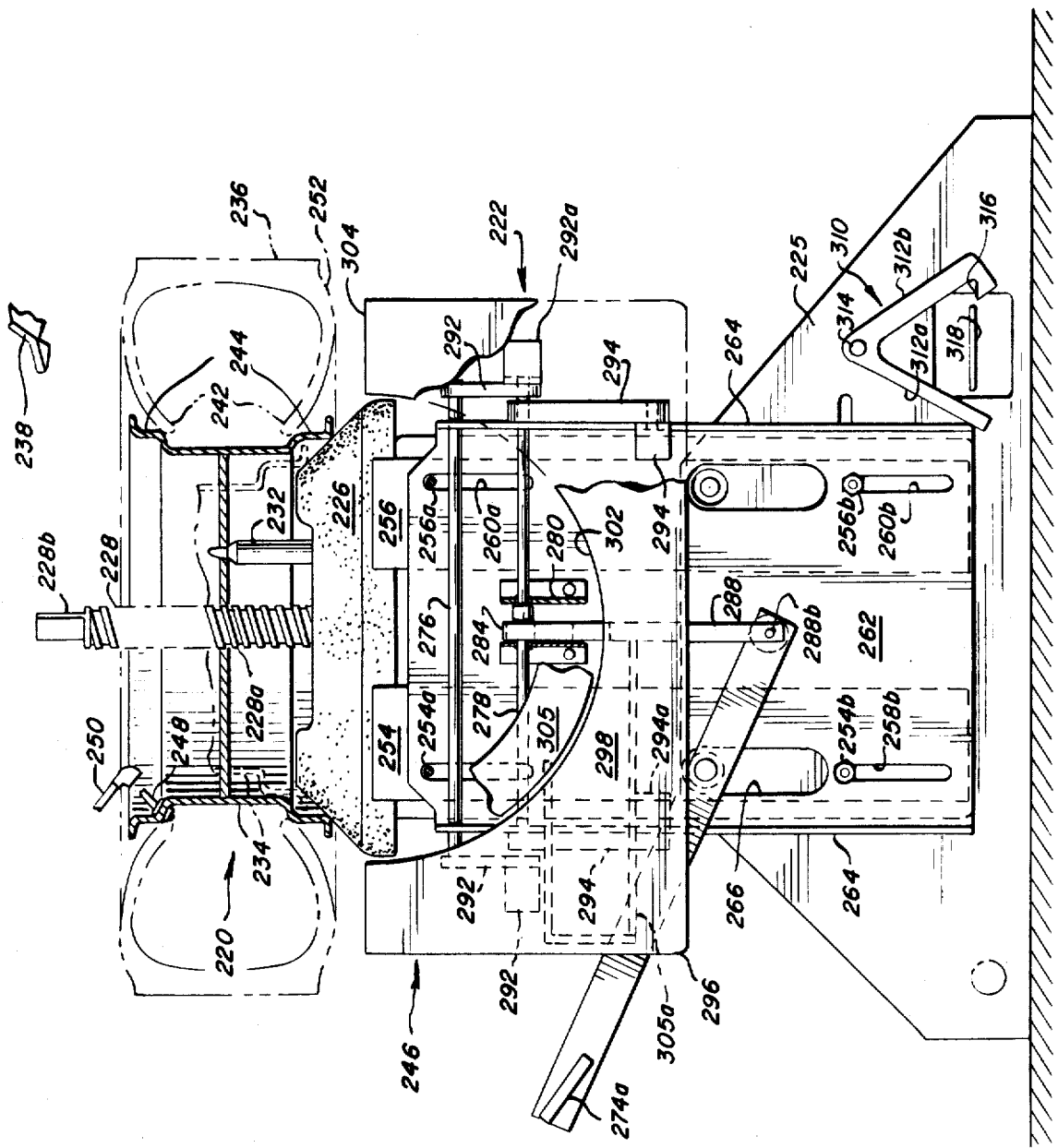
FIG. 12 is a side elevational view of the second mode of this invention showing the chamber forming portions in a fully retracted position.
Figures 15, 16:
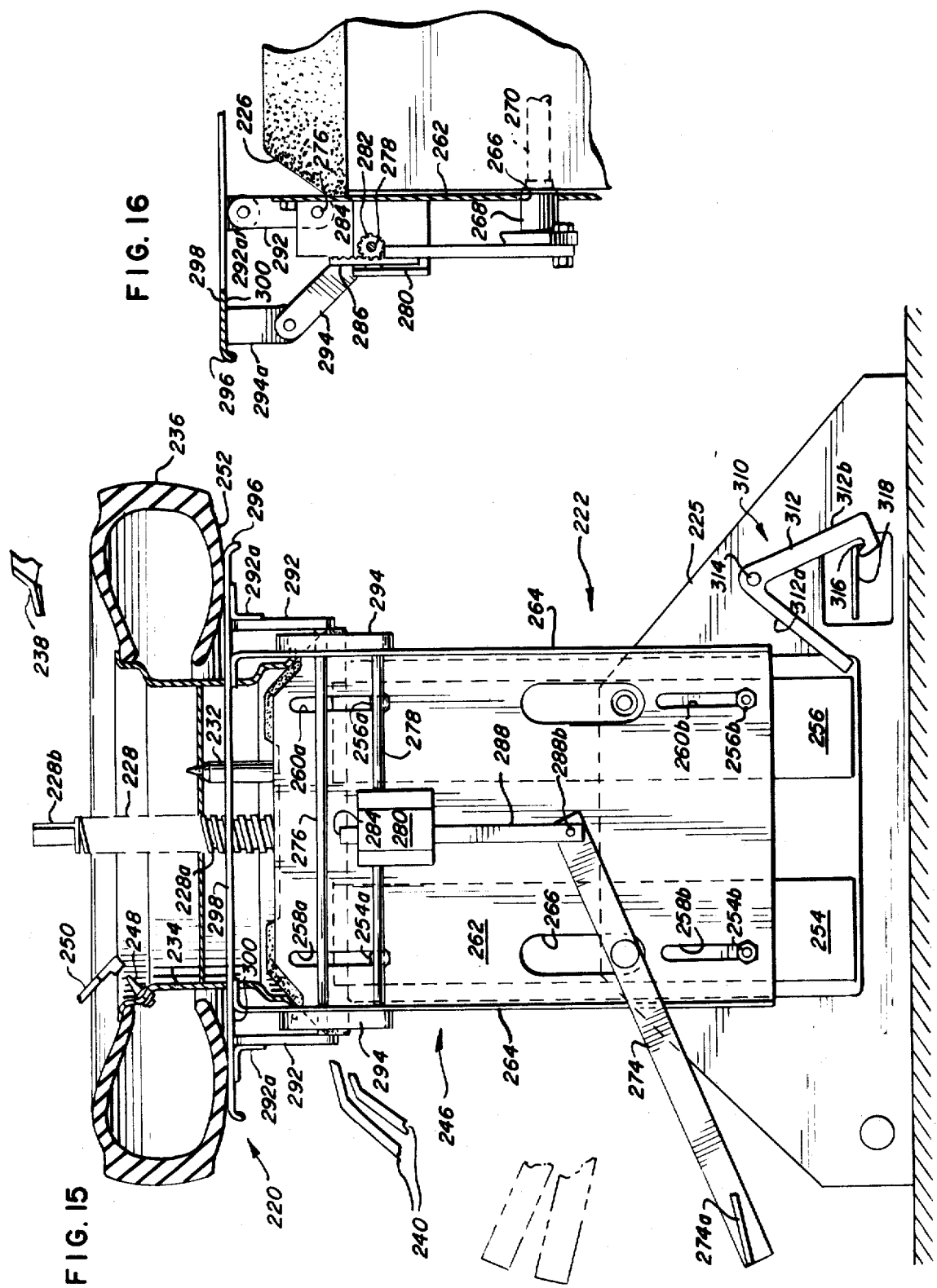
FIG. 15 is a view similar to FIGS. 12 and 13 with the chambers in a fully extended position in engagement with a tire side wall.
FIG. 16 is a side elevational view of the structure shown in FIG. 15.

Each rod 276 and 278 has a pair of connecting links 292 and 294, respectively, connected thereto. Each pair of links 292 and 294 is pivoted to depending brackets 292a and 294a which depend from the underside of two inflation chamber sub-portions 296 on each side of the stand 222. Each inflation chamber sub-portion 296 is preferably identical and they are arranged in the tire changing stand 222 in mirror image opposition relative to each other so that they may be moved together to form an inflation chamber assembly. The links 292 and 294 mount the sub-portions 296 to the frame 262 for movement between a retracted, or collapsed position, wherein the chamber sub-portions 296 lie closely adjacent to the stand as shown in FIGS. 10 and 12; through movement through an arc as represented in FIG. 14, to a chamber assembly forming position wherein the two chamber sub-portions 296 are assembled together as represented in FIGS. 13 and 14. The frame member 262 is movably mounted with respect to the tire changing stand 222 for movement between a retracted position, as shown in FIGS. 10 and 12 through 14, to movement to an extended tire side wall engaging position, as shown in FIGS. 15 and 16. The movement of the frame member 262 does not occur until after the two chamber sub-portions 296 have been assembled together by the provision of the rack and pinion arrangement 282 and 286. The free end 288a of the bar 288 limits the travel of rack 286 relative to 282 following which the free end 288a engages the pinion 282 so that continued vertical movement of bar 288 raises the entire frame 262 relative to the tire changing stand 222.

The inflation chamber sub-portions 296 are generally flat plate-like members having an upper, or tire side wall engaging surface 298, and a lower surface 300 from which the brackets 292a and 294a depend. A generally semi-circular recess 302 for providing clearance with respect to the rim receiving area 226 extends inwardly from the leading edge 304. Edges 304 of each of the sub-portions 296 abut when the sub-portions are moved to the positions shown in FIGS. 13 and 14 where they form an inflation chamber assembly 299.

When the frame 262 is moved upwardly to the extended position shown in FIGS. 15 and 16, the inflation chamber assembly 299 will force against the lower tire side wall 252 forcing the upper tire bead 242 towards seating engagement with the rim bead seat 44. As shown in FIG. 12, it is contemplated that a depending skirt 305 of yieldable material, such as rubber, or the like, could be resiliently mounted to the recess 302 by suitable means, such as a torsion bar arrangement 305a, to provide a seal with respect to a rim when the inflation chamber assembly 299 is moved upwardly into engagement with the tire side wall 252 as shown in FIG. 15. At this point, a sub-chamber is formed about the exterior of the tire by the engagement of the upper surface 298 with the tire side wall 252 and the sealing skirt 305 which depends from the recess 302 and its engagement with the edge of the rim 244. Thus, air introduced under pressure through the valve stem 248 will cause the tire side walls 252 to expand and seat the tire beads 242 on the rim bead seats 244 and continue to inflate the tire, moving the inflation chamber assembly 299 of the two sub-portions 296 downwardly during the inflation operation.

Means 310 are provided for preventing the operation of the bead breaker shoe assemblies during the operation of the inflation assembly. This means 310 includes a lock member 312 having two leg portions 312a and 312b pivoted at 314 to the frame 225 of the tire changing stand 222. Leg 312b terminates in an inwardly directed foot 316. Leg 312a abuts the side of frame member 262. Leg 312b and its foot 316 are of greater mass than leg 312a so that the lock member 312 is normally urged in a clockwise direction or towards the frame member 262. The foot 316 is positioned to move under the actuating pedal 318 for the bead breaker assemblies 238 and 240 when the frame member 262 is moved upwardly to permit the clockwise movement of lock member 312. Thus, when the frame member 262 is in the retracted position, shown in FIGS. 12 and 13, the frame member 262 urges the lock member 312 in a counterclockwise direction so that the locking foot 316 is removed or spaced away from the foot pedal 318. However, when the frame member 262 is moved upwardly to position the inflation chamber components 296 into engagement with the side walls 252 of a tire, the locking member 312 is free to move counterclockwise a limited distance which brings the locking foot 316 under the foot pedal 318, thereby preventing depression of the foot pedal 318 and, consequently, preventing the actuation of the motive means for driving the bead breaker shoes 238 and 240 and the rotatable post extension 238b of the center column.

It is also contemplated that the second mode of this invention could be formed in another embodiment 320, wherein the inflation chamber sub-components are formed as identical halves of concentric sleeve members similar to the concentric sleeve members of the inflation chamber assembly 62 described in FIGS. 1 through 9. The two halves would be substituted for the sub-portions 296 and otherwise would be similarly connected with the frame member 262 and the actuating lever 272 for movement from a retracted position, in generally upright plane, to an assembled position, in a generally horizontal plane, and then for movement with the frame assembly 262 into engagement with the tire side wall.

Mode 320 of this invention is also intended for use with a tire changing stand of the type described and claimed in Strang et al. U.S. Pat. No. 3,255,800 and similar reference numerals 322 through 344 refer to the same parts as numerals 22–24 employed in the description of the embodiment of FIGS. 1–9, inclusive. In addition, it is contemplated that the mode 320 would also have frame members 362 mounted to frame components of the tire changing stand 322 in a manner substantially identical with respect to that described for the frame components 262 of mode 220.

Thus, the mode 320 is provided with two frame members 362, each having flange portions 364 between which the rods 376 and 378 are pivotally mounted. Further, it is contemplated that rods 378 would be actuated in the same fashion as rod 278 by means of a similar rack and pinion arrangement. Links 392 and 394 extend from the rod 376 and 378 to pivotal connection with depending webs 392a and 394a of each inflation assembly sub-portion 346.

Each inflation assembly sub-portions 346 is similar to one half of assembly 46 and particularly, the chamber 62 thereof, in that an inner or remote sleeve 424 and an outer or tire side wall engaging sleeve 432 are provided. The outer sleeve 432 has an arcuate outwardly extending flange portion 440 which is intended to engage the side wall of the tire, whereas the inner sleeve 424 has an upper annular flange 426 terminating in an enlarged central opening 430, and it is intended that the flange 426 would abut the rim 434 of a wheel when secured on the rim supporting surface 326 of the stand 322. Inner sleeve 424 also includes an annular, outwardly extending flange portion 428 and a ring-like sealing member is interposed between lower lip 434 of outer ring 432. Spring means 448 extends between connections 449 on the underside of the flange portion 440 of outer ring 432 and connections 450 on the radial extension 451 of inner ring 424 to normally bias the inner and outer sleeves 424 and 432 together.

Figure 18:
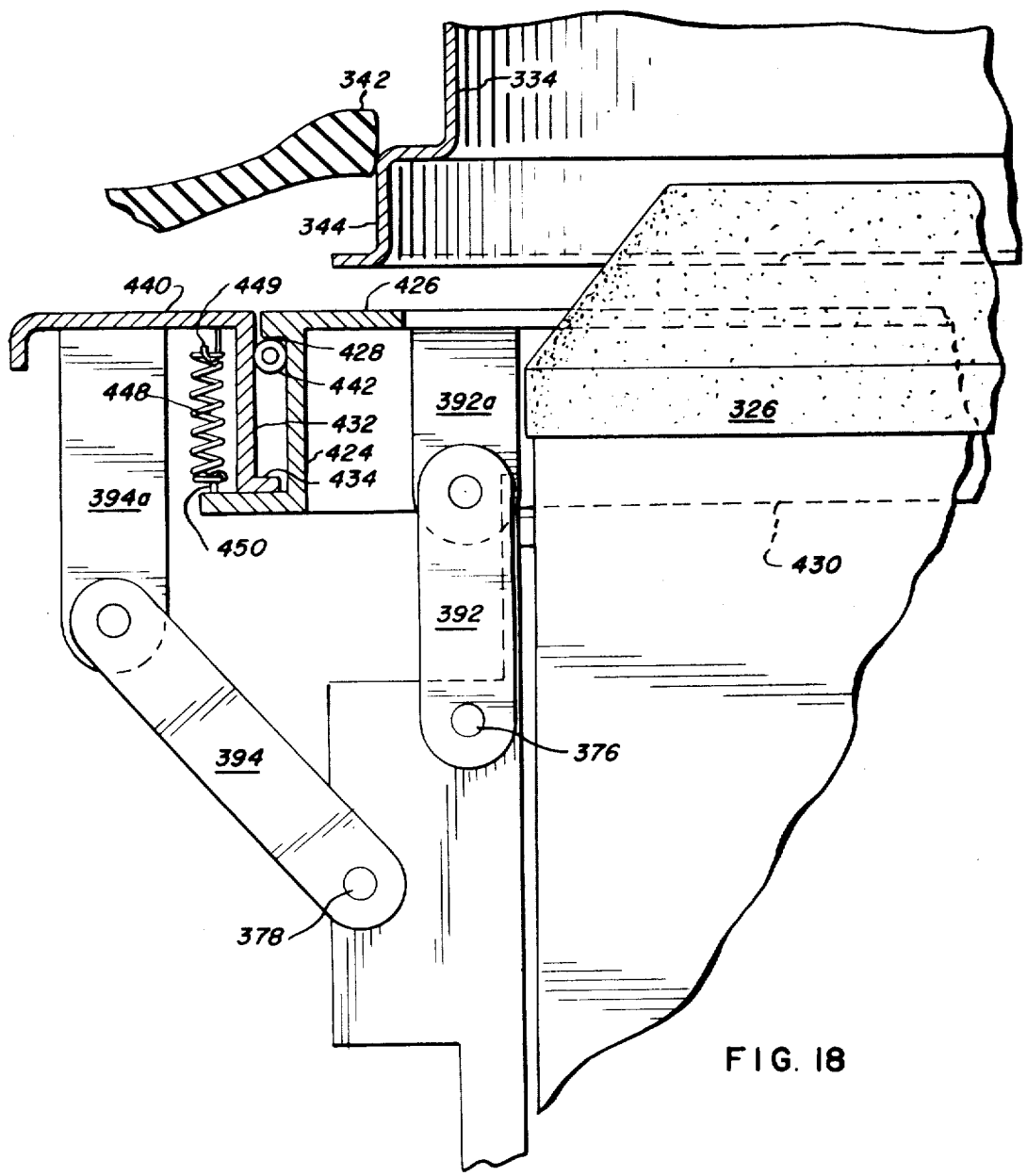
FIG. 18 is a view similar to FIG. 17 showing the chamber assembly sub-portion in an assembled position.

The outer sleeve 440 has an enlarged central opening 438 for providing clearance with respect to a vehicle rim so that the outer sleeve may be urged upwardly against a tire side wall and the inner sleeve 424 may continue to move upwardly so that the portion 426 may engage the tire rim. The engagement of portion 426 with the tire rim and the engagement of portion 440 with the tire side wall together with the sealing ring 442 defines a chamber with respect to a tire 336 held on the vehicle rim 334 mounted on the tire changing stand 322. Thus, air may be introduced under pressure through tire valve (not shown) in a manner described previously herein to seat the tire beads 342 and inflate the tire 336. Each inflation assembly sub-portion 346 is movable from a retracted position, as shown in FIG. 17, to an assembled position with respect to a mating portion to form an assembly 347, as shown in FIG. 18, with the movement between these two positions being substantially identical and carried out in substantially the same way as the movement between the positions shown in FIGS. 12 and 13 with respect to the mode 220. Further, the assembly 347 may then be moved upwardly into an inflating and seating position into engagement with a tire side wall 352 and a vehicle rim 334 in substantially the same fashion as shown and described with respect to mode 220 in FIG. 15.

Thus, it can be seen that this invention provides a unique apparatus for inflating tires and provides a unique combination tire changing stand and inflation apparatus. In the three structures shown in the drawings, the tire changing stand is of the type which has both upper and lower bead breaker shoes, plus a rotatable tire driving tool extension so that a complete tire servicing function may be easily and quickly carried out on the tire changing stand. Moreover, the rim and replaced tire remain in position on the tire changing stand for the bead seating and inflating function. There is no need to move the rim and tire to a separate apparatus. In each of the disclosed structures an inflation assembly is movable from a retracted position to an extended inflation chamber assembly wherein a portion of the inflation assembly engages a tire side wall and another portion engages a rim, so that air may be introduced under pressure to the tire valve stem to seat the tire beads and inflate the tire. Moreover, the inflation assembly moves into a registered position with respect to a tire held at the rim receiving area of the stand and such registration is relatively significant in that it is believed that if the inflation assembly is relatively centered with respect to the center of the vehicle rim and tire, optimum inflation and seating conditions exist.

In the first mode, shown in FIGS. 1 through 9, the inflation assembly consists of two concentric sleeves mounted on an arm movable from a retracted upright position to an operable position overlying the rim receiving area. In the second mode in the two embodiments shown in FIGS. 10 through 19, the common concept is that of two half portions of an inflation chamber forming assembly being mounted on each side of the tire changing stand for movement between a retracted, or vertical orientation, to movement to an assembled, horizontal, orientation, with the two halves joined together to form one assembly; and further movement through a common lever member of the entire formed assembly upwardly into engagement with a tire side wall and vehicle rim so that air may be introduced under pressure through the tire valve stem to seat the beads and inflate the tire. In one embodiment of the second mode, the two chamber assembly sub-portions are plate-like members whereas in the other embodiment of the second mode the two inflation chamber sub-portions are two halves of concentric sleeves similar to that utilized in the first mode described in FIGS. 1 through 9. In either event, the concept is to bring together two sub-portions from opposite sides of the stand to form one assembly, which is then moved into the operative position for inflating the tire.

Thus, in summary, with structure disclosed in this invention, the complete tire removal and replacement function may be carried out on the tire changing stand following the mounting of the rim on the receiving area without any subsequent removal of the rim, until the new or replaced tire has been substituted for the old tire and has been properly seated and inflated to the desired pressure, following which it is only necessary to directly transport the tire to the vehicle for mounting.

The foregoing detailed description has been given for clearness of understanding only, and no unnecessary limitations should be understood therefrom, as some modifications may be obvious to those skilled in the art.

I claim:

1. An inflation apparatus comprising: means defining a frame; a rim receiving area on said frame; complementary inflation chamber portions either side of said frame mounted for movement toward and away from each other to form a chamber assembly and for movement toward said tire receiving area on said frame to form a chamber therewith, whereby air may be fed through the valve stem of the wheel rim into said tire and contained within the tire and said chamber for seating and inflating a tire relative to a rim.

2. In combination: a tire changing stand including means defining a frame; a wheel receiving area on said frame for receiving a vehicle rim and tire thereon; upper and lower bead breaker means on said frame for movement toward and away from said wheel receiving area for separating tire beads relative to a rim; chamber forming means mounted on said frame; said chamber forming means being generally of a size and shape to form a subchamber with a tire side wall when placed in engagement therewith, said chamber forming means including means therein for gaining access to the valve stem of a wheel rim when said chamber forming means is in engagement with a tire side wall; means for mounting said chamber forming means relative to said frame for movement towards and away from said wheel receiving area, including means for bringing said chamber forming means generally into registration with a tire held at said wheel receiving area of said tire changing stand whereby a vehicle rim may be placed on said tire receiving area and a tire separated therefrom by said bead breaking means, another tire placed on said wheel rim held at said wheel receiving area and said other tire seated and inflated following movement of said chamber forming means into engagement with said other tire and rim and the application of air under pressure through the valve stem of said vehicle rim, said chamber means comprising first and second chamber elements mounted to said stand for movement from a retracted position below said tire receiving area to an extended position into engagement with the side wall of a tire held on the tire receiving area.

3. The combination of claim 2 wherein said chamber means comprises first and second chamber components which are movable toward each other to form a chamber assembly during movement from said retracted position to said extended position.

4. The combination of claim 3 wherein each chamber component is movable from a retracted position, generally lying in an upright plane, to an engaged position, generally in horizontal plane, whereby said chamber assembly is formed.

5. The combination of claim 4 wherein said chamber components are further mounted to the frame for movement in an upright direction following engagement of said components together to form said chamber assembly.

6. The combination of claim 5 wherein each chamber component is pivotally mounted to a plate member which is mounted to said frame for movement in an upright direction.

7. The combination of claim 6 wherein lever means is connected to said chamber components for movement of said chamber components together toward each other to form said chamber assembly.

8. The combination of claim 7 wherein said lever is further connected to said chamber mounting plates for movement of said chamber mounting plates in an upright direction following movement of said chamber components together to form said chamber assembly.

* * * * *